Patented Aug. 11, 1931

1,818,215

UNITED STATES PATENT OFFICE

ALBERT K. EPSTEIN AND BENJAMIN R. HARRIS, OF CHICAGO, ILLINOIS

EGG WHITE PRODUCT AND PROCESS

No Drawing.   Application filed August 8, 1929.   Serial No. 384,472.

Our invention relates to an improved egg white product and process for producing such product.

Ordinary liquid egg white as separated from the yolk material contains approximately 13% solid materials and 87% moisture. In many industries it is required to use an egg white with a lower moisture content, at the same time retaining its maximum beating qualities.

On account of the delicacy of the albuminous material it is readily subject to coagulation, and it is not advisable nor practicable to reduce the moisture content simply by direct heating.

In order to meet the demand for an egg white of lower moisture content than that in the natural product we have prepared an egg white which contains a smaller amount of water in relation to the solid material, and retained the maximum beating values. Briefly our process consists in suitably drying a quantity of egg white and then dissolving such dried white in the natural liquid whites, thereby obtaining a homogeneous beatable product of any desired solid concentration.

In carrying out our process we usually dry the egg whites in very thin layers. When the product is dry we dissolve a convenient amount of the dried product in liquid egg whites. In this connection it is preferred to have the dried egg white in a granular form so that it will offer a larger surface to the liquid egg whites and thus dissolve more quickly and completely. In the above process before drying, the egg white is ripened, such ripening continuing through the drying process to obtain any desired degree of acidity. After the dried product is added to the liquid egg white the whole is allowed to stand until the dried product becomes completely dispersed.

As an example 100 pounds of liquid egg whites may be selected and 13 pounds of dried egg whites added thereto very slowly and with little mixing, allowing the mixture to stand overnight at a temperature of about forty degrees Fahrenheit. The following day the product may be used if desired, or it may be frozen to a solid mass and kept in this condition at ordinary egg freezing temperature of about zero degrees Fahrenheit until desired for use. When desired for use, it is then thawed out until the product obtains mobility and can be used in connection with other ingredients as the case may require.

In the above example we obtain 113 pounds of egg whites which contain approximately 25% of egg white solids or practically twice as much solids as are present in the ordinary liquid egg white in the natural state. For many practical purposes the above concentration, namely 25% egg white solids, is satisfactory but any convenient quantity may be used and we do not limit our invention to the exact amount of dried egg whites dissolved. However, too large a quantity may be difficult to put into solution.

In many instances we may use a dried egg product which contains modifying agents such as water soluble polyhydroxy compounds, for example cane sugar, dextrose, lactose or small proportions of other crystalloids such as sodium chloride.

We may also add these modifying agents to the liquid egg whites before the dried egg whites are dissolved or we may add the modifying agents with the dry egg product. Thus for example we may add to each 100 pounds of liquid egg whites, 1 to 1½ pounds of cane sugar and 14 pounds of dried egg albumen.

What we claim as new and desire to protect by United States Letters Patent is:

1. The process of manufacturing a concentrated liquid egg white which consists in drying egg whites, and dissolving the dried product in natural liquid egg white.

2. The process of manufacturing a concentrated liquid egg white consisting in drying egg white, and dissolving the dried product and a relatively small amount of a water soluble polyhydroxy compound in liquid egg white.

3. The process of manufacturing a concentrated frozen egg white which consists in drying egg white, dissolving the dried product in liquid egg white, freezing below temperature of decomposition to a solid mass and maintaining it in a frozen condition until desired for use.

4. The process of manufacturing a concentrated liquid egg white which comprises drying egg white, dissolving the dried egg white product and a relatively small amount of a water soluble polyhydroxy compound in liquid egg white, and freezing the resulting product below the temperature of decomposition to a solid mass and maintaining it in a frozen condition until desired for use.

5. As a new article of manufacture, a liquid egg white product consisting of an intimate mixture of natural egg white of normal moisture content and discrete particles of dried egg white, the said product containing an increased percentage of egg white solids and possessing at least as good beating qualities as fresh liquid egg whites.

In witness whereof, we hereunto subscribe our names this 5th day of July, 1929.

ALBERT K. EPSTEIN.
BENJAMIN R. HARRIS.